US006182560B1

(12) United States Patent
Andress (10) Patent No.: US 6,182,560 B1
(45) Date of Patent: Feb. 6, 2001

(54) VERTICAL HEARTH BARBECUE GRILL

(76) Inventor: Alphonso G. Andress, Malecon Balta 720, Lima 18 (PE)

(*) Notice: Under 35 U.S.C. 154(b), the term of this patent shall be extended for 0 days.

(21) Appl. No.: 09/332,903

(22) Filed: Jun. 15, 1999

(51) Int. Cl.[7] ............................... A47J 37/00; F24B 3/00

(52) U.S. Cl. ............................... 99/400; 99/401; 99/446; 99/448; 99/449; 126/25 R; 126/9 R (58) Field of Search ........................... 99/385, 389, 390, 99/400, 401, 444, 445, 446, 448, 449; 126/25 R, 9 R (56) References Cited

U.S. PATENT DOCUMENTS

| | | |
|---|---|---|
| D. 134,248 | 11/1942 | Reichart . |
| D. 155,631 | 10/1949 | Roedter . |
| D. 214,655 | 7/1969 | Miles . |
| D. 232,510 | 8/1974 | Liakouras et al. . |
| D. 262,348 | 12/1981 | Levy . |
| D. 285,161 | 8/1986 | Cairns ................................ D7/334 |
| D. 286,256 | 10/1986 | Jung . |
| D. 329,960 | 10/1992 | Reynolds .......................... D7/334 |
| D. 376,722 | 12/1996 | Oftedal et al. ..................... D7/332 |
| 1,018,116 | 2/1912 | Kowalski . |
| 1,231,087 | 6/1917 | Spieth . |
| 1,307,713 | 6/1919 | Riper . |
| 2,154,165 | 4/1939 | Huntington . |
| 2,164,147 | 6/1939 | Schneider . |
| 2,379,239 | 6/1945 | Krebs .................................... 99/421 |
| 2,734,499 | 2/1956 | Lombardi ......................... 126/25 R |
| 2,838,991 | 6/1958 | Kleinmann et al. . |
| 2,855,918 | 10/1958 | Tescula ............................. 126/25 R |
| 2,885,950 * | 5/1959 | Stoll et al. ............................ 99/340 |
| 3,085,562 | 4/1963 | Persinger et al. ................. 126/25 R |
| 3,140,651 | 7/1964 | Barnett . |
| 3,175,549 | 3/1965 | Bergsten ........................... 126/25 R |
| 3,182,585 | 5/1965 | Rensch et al. .................... 126/25 R |

(List continued on next page.)

Primary Examiner—Reginald L. Alexander
(74) Attorney, Agent, or Firm—Kile McIntyre Harbin & Lee (57) ABSTRACT

A gas-fired or briquette-burning barbecue grill that outputs extremely high BTUs from a removable, vertical firebox that is backwardly inclined so as to provide a combination of direct and indirect heating. In addition, multiple cooking grids positioned at various vertical levels across the face of the firebox provide an enormous cooking area for grilling, broiling, and searing. Inclination minimizes ash avalanche during briquette burning and also increases the effective heating area applied to multiple cooking grids of gas-fired and briquette-burning grills. A top grid located directly over the firebox provides a surface for searing or high-temperature cooking (i.e., direct heating), a mid-level cooking grid provides medium temperature indirect and/or partial direct heating cooking, and a lower main cooking grid provides indirect medium temperature for broiling or baking. A pair of opposed insulated sidewalls on each side of a central heating area includes respective sets of rail guides which support cooking grids at varying distances from the firebox. The sidewalls also help confine heat in and about the cooking grids and may also support a removable, hinged cover lid that establishes an oven-like enclosure about the mid-level and main cooking grids to provide a baking/broiling chamber. Grid elements of the main cooking grid, which is downwardly inclined about three degrees toward the front of the gill, comprise oppositely facing channels that route grease drippings from cooking foodstuffs to a grease-catching receptacle. The firebox rests in a cradle or receptacle and is adapted to be easily removed by a grasp handle insertable in a surface of the firebox. A wire basket inside the metal firebox retains briquettes in spaced relation to the firebox walls thereby to provide an ash reservoir for briquettes as they burn and/or to thermally insulate hot fuels from the sidewalls and top lid of the grill. Portable versions of the grill collapse like a suitcase (with all grill components contained therein), fold-up legs may be provided, side shelves may be attachable, and/or a rotisserie rod may be added.

14 Claims, 8 Drawing Sheets

U.S. PATENT DOCUMENTS

| | | | | |
|---|---|---|---|---|
| 3,224,357 | | 12/1965 | Rubens . | |
| 3,230,948 | | 1/1966 | Schmitt | 126/25 R |
| 3,324,788 | * | 6/1967 | La France | 99/389 |
| 3,343,527 | | 9/1967 | Manteris | 126/25 R |
| 3,550,525 | | 12/1970 | Rabello | 99/421 |
| 3,572,313 | | 3/1971 | Ciancaglini . | |
| 3,581,654 | | 6/1971 | Tescula . | |
| 3,604,408 | | 9/1971 | Tescula | 126/25 R |
| 3,611,912 | | 10/1971 | Choc . | |
| 3,742,838 | | 7/1973 | Luschen et al. . | |
| 3,783,855 | | 1/1974 | Newinger | 126/25 A |
| 3,832,989 | | 9/1974 | Belford | 126/25 R |
| 3,999,472 | | 12/1976 | Einto | 99/340 |
| 4,120,237 | | 10/1978 | Mecherlen | 99/340 |
| 4,338,912 | | 7/1982 | Gaskins | 126/25 A |
| 4,442,824 | | 4/1984 | Amici | 126/25 R |
| 4,598,690 | | 7/1986 | Hsu | 126/25 R |
| 4,730,597 | | 3/1988 | Hottenroth et al. | 126/15 R |
| 5,031,602 | | 7/1991 | Vick | 126/25 R |
| 5,241,948 | * | 9/1993 | Thibodeau | 126/25 R |
| 5,243,961 | | 9/1993 | Harris | 126/9 R |
| 5,255,664 | | 10/1993 | Gurliacci | 126/276 |
| 5,259,299 | * | 11/1993 | Ferraro | 99/445 X |
| 5,279,214 | * | 1/1994 | Lamendola | 99/445 |
| 5,333,540 | | 8/1994 | Mazzocchi | 99/421 H |
| 5,431,093 | | 7/1995 | Dodgen | 99/427 |
| 5,499,574 | | 3/1996 | Esposito | 99/339 |
| 5,536,518 | | 7/1996 | Rummel | 426/523 |
| 5,655,437 | | 8/1997 | Vitacca | 99/400 |
| 5,823,174 | | 10/1998 | Andress | 126/25 R |
| 5,836,295 | | 11/1998 | Faraj | 126/25 R |
| 5,947,007 | * | 9/1999 | O'Grady | 99/340 |

* cited by examiner

VERTICAL HEARTH BARBECUE GRILL

CROSS-REFERENCE TO RELATED PATENTS AND PATENT APPLICATIONS

This invention is related to commonly-owned U.S. Pat. No. 5,823,174 entitled Portable Cooking Device with Vertically Arranged Hearth, which issued on Oct. 20, 1998, in the name of the same inventor hereof, which is expressly incorporated by reference.

This invention is also related to commonly-owned, allowed U.S. Pat. No. 5,947,007,which issued Sep. 7, 1999 on an application entitled Firebox for Vertical Hearth Barbecue Grill, filed Dec. 31, 1998 in the name of Richard O'Grady, et al., which is also incorporated herein.

This invention is further related to commonly-owned U.S. Pat. No. 6,000,388 which issued on Dec. 14, 1999, entitled Barbecue Grill with Vertical Hearth, Rotisserie Attachment, and/or Pot Rack in the name of the inventor hereof, which is also incorporated herein.

BACKGROUND OF THE INVENTION

Market appearance of vertical barbecue grills has been scarce but many prior patents have issued directed to such devices. Some of the prior devices are even portable, collapsible, and even serve as space heaters. Prior patents include:

| Pat. No. | Inventor |
| --- | --- |
| 5,333,540 | Mazzocchi |
| 5,431,093 | Dodgen |
| 3,343,527 | Manteris |
| 3,230,948 | Schmitt |
| 4,120,237 | Mecherlen |
| 3,999,472 | Einto |
| 3,783,855 | Newinger |
| 3,611,912 | Choc |
| 3,550,525 | Rabello |
| 3,175,549 | Bergsten |
| 3,572,313 | Ciancaglini |
| 2,379,239 | Krebs |
| 2,154,165 | Huntington |
| D155,631 | Roedter |
| D262,348 | Levy |
| D285,161 | Cairns |
| 3,224,357 | Rubens |
| 2,838,991 | Kleinmann et al. |
| D134,248 | Reichart |
| D329,960 | Reynolds |
| 5,255,664 | Gurliacci |
| D376,722 | Oftedal et al. |
| D286,256 | Jung |
| D232,510 | Liakouras, et al. |
| D214,655 | Miles |
| 5,823,174 | Andress |
| 3,581,654 | Tescula |
| 3,604,408 | Tescula |
| 3,140,651 | Barnett |
| 2,734,499 | Lombardi |
| 3,742,838 | Luschen et al. |
| 3,832,989 | Belford |
| 4,338,912 | Gaskins |
| 4,730,597 | Hottenroth et al. |
| 5,499,574 | Esposito |
| 5,536,518 | Rummel |
| 3,182,585 | Recsch et al. |
| 3,085,562 | Persinger et al. |

U.S. Pat. No. 5,333,540 to Mazzochi is particularly relevant in disclosing a collapsible, consumer-oriented portable vertical barbecue grill but lacks, among other things, an inclined firebox. Inclination advantageously provides direct and indirect heating at the same time. U.S. Pat. No. 3,999,472 to Einto discloses a "convertible" grill having a firebox alterable between vertical and horizontal positions. U.S. Pat. No. 3,783,855 shows a combination space heater and grilling device having a pivoting firebox and ash receiving tray assembly where space heating occurs in the vertical position and grilling occurs in a horizontal position. U.S. Pat. No. 5,431,093 to Dodgen shows an inclined hearth located deep within a fire chamber of a barbecue grill but without horizontally disposed, accessible cooking grids across the face thereof. U.S. Pat. No. 3,343,527 to Manteris shows a vertical hearth grill including a grease trap and a barrier belt positioned at a cooking grid level to assist in air circulation. Some prior grills provide double hearths on opposed sides of a grid for more even cooking, but to attain portability and compactness a single hearth is generally acceptable.

In light of the design, construction, and limitations of these and perhaps other prior vertical grilling devices, problems confronted and/or addressed by the present invention include but are not limited to achieving simultaneously multi-temperature and multi-mode cooking (direct and indirect heating), simultaneous underside and laterally cooking, thermal insulation from extreme firebox heat, ash containment and removal for easy clean-up, channeling and trapping grease drippings, strength and rigidity of deployed grill assembly, convertibility to an oven, portability and transportability of a collapsed grill, stability of a grill assembly when fully deployed, and/or containment of grill parts for transport and storage.

In view of the above-stated problems, it is an objective of the present invention to provide improved grilling, broiling and searing by providing a combination of direct and indirect heating of foodstuffs by utilizing an inclined firebox.

It is also a general objective of the present invention to provide a method of changeably applying direct and/or indirect heating during cooking, grilling, broiling, or barbecuing of foodstuffs on horizontal grids positioned across the face of an inclined firebox.

It is a further objective of the present invention to provide an apparatus and method for applying underside and lateral heat for cooking foods.

It is a yet an additional objective of the present invention to augment thermal insulation of an external housing of a vertical barbecue grill by providing an arrangement to displace the fire chamber from rear and vertical walls of the grill assembly and by spacing hot coals in a basket within the firebox.

It is yet another objective of the invention to provide, at least for briquette-burning grills, a firebox that avoids ash avalanche over cooking foods and for providing an ash reservoir within a firebox that may be removed without disturbing other parts of the grill.

It is yet another objective of the present invention to provide a vertical barbecue grill construction enabling convertibility to an oven for baking, roasting, grilling, etc.

It is yet a further objective of the present invention to provide a deployable barbecue grill having a rigid and stable structure in a fully deployed and extended mode.

It is yet an additional objective of the present invention to provide a barbecue grill that is stable against backward tipping due a rearward displacement of the center of gravity when deployed and loaded with charcoal.

It is yet a further objective of the present invention to provide a self-contained vertical barbecue grill assembly that is collapsible for convenient transport, storage, and shipping.

Other objectives will become readily apparent from the following description.

SUMMARY OF THE INVENTION

Improvements of the present invention include but are not limited to providing a backwardly inclined hearth or firebox for a vertical barbecue grill (gas-fired or charcoal burning), providing multiple cooking grids positionable at various vertical levels across the face of the backwardly inclined hearth or firebox, providing a coal or grate basket for insulation and/or creating an ash reservoir directly in the firebox, providing thermally insulated sidewalls that also slideably support multiple cooking grids and that receive a cover or a hinged cover to convert the area between sidewalls to an oven-like enclosure for baking or broiling, providing a vertical grill structure that facilitates inclined support and convenient removal of a heated firebox, and/or providing an arrangement of components which collapses and which is contained in an about a suitcase like unit for convenient shipping or transport. In addition, the invention also encompasses methods for simultaneously providing direct and indirect heat during cooking.

Other features, aspects, and advantages of the invention will become apparent upon review of the following description of illustrative embodiments taken in conjunction with the accompanying drawings. The invention, though, is pointed out with particularity by the appended claims.

DESCRIPTION OF ILLUSTRATIVE EMBODIMENTS

Figure 1A:
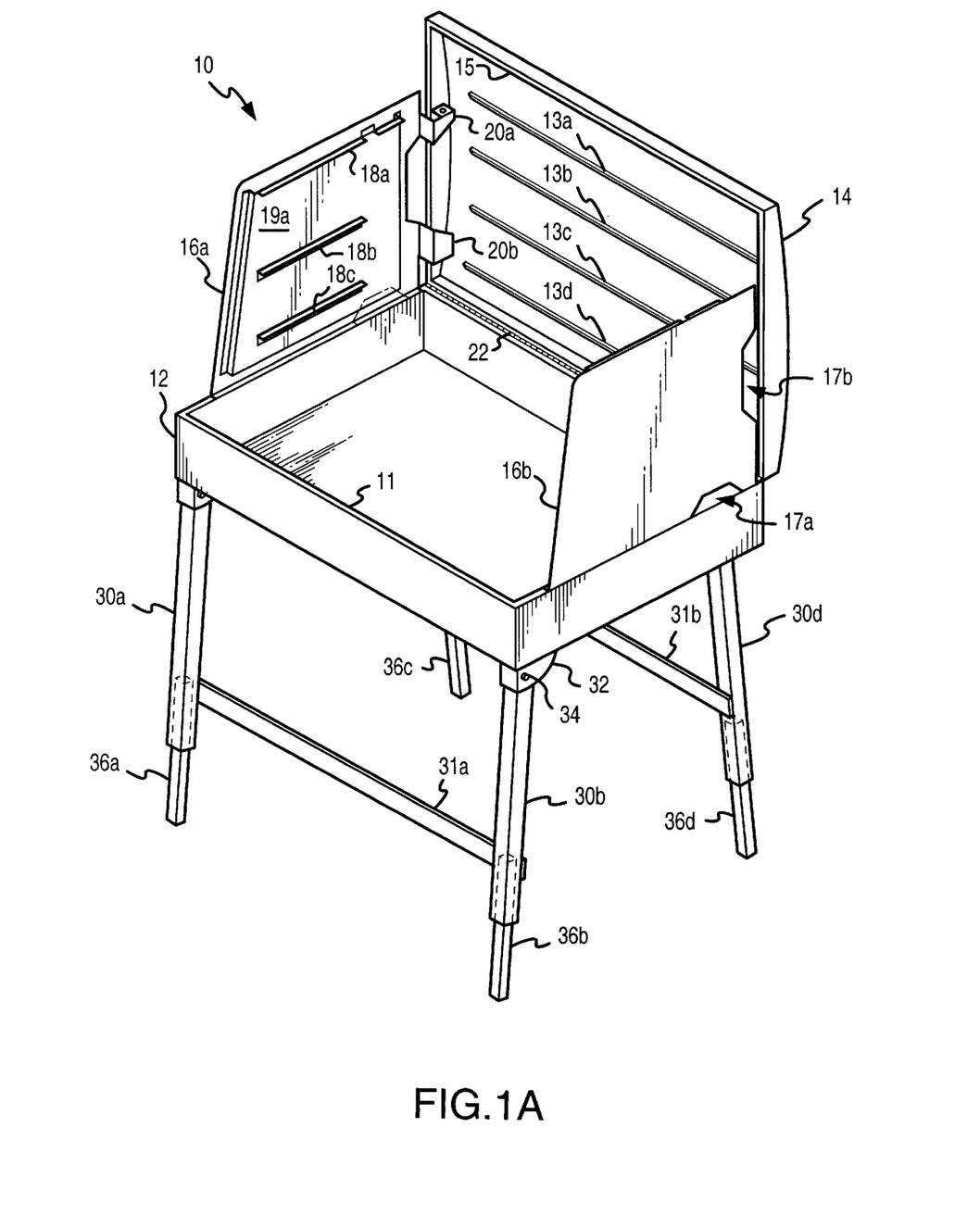
FIG. 1A is a perspective view of a preferred structure of a collapsible, deployable barbecue grill in deployed mode absent, among other things, a high-temperature firebox and multiple cooking grids.

FIG. 1A shows an illustrative embodiment of a barbecue grill 10 constructed in accordance with one aspect of the invention, which is trade named "V-Broiler." The grill includes a housing comprising a lower base cavity 12, a top lid 14, and a pair of opposed sidewalls 16a and 16b, preferably made of sheet metal. Some or all of these components may be sand, shell or die casted of steel, or a high-temperature aluminum or other alloy. Top lid 14 includes a series of stiffening ribs 13b, 13b, 13c, and 13d stamped into the sheet metal to reduce warping tendencies when exposed to extreme heat of a firebox. Base cavity 12 includes a lip 11 that mates with a corresponding lip 15 of top lid 14 in sealed relation when the unit is closed. Lips 11 and 15 of the respective base cavity and top lid may be beveled outwardly towards each other to establish therebetween spring-loaded compression sealing when the grill is closed. A two to three degree bevel angle should suffice. Piano hinge 22 pivotally connects the top lid 14 to the base cavity 12, and also assists in sealing the rear edges the top lid and base cavity when closed. Other sealing arrangements as known in the art may also be employed, either by various hinge designs or construction arrangements of mating lips of top lid 14 and base cavity 12. In addition, the base cavity includes brackets (not shown here) attached to the inside thereof for supporting the lower portion of a removable firebox that rests in an inclined position. As stated herein, inclination advantageously provides simultaneous direct and indirect heating of foodstuffs on cooking grids placed in the vicinity thereof. Indirect heat emanates laterally from the vertical hearth of the firebox while direct heating is applied underneath the cooking grid above the heated fuel source.

Figure 1B:
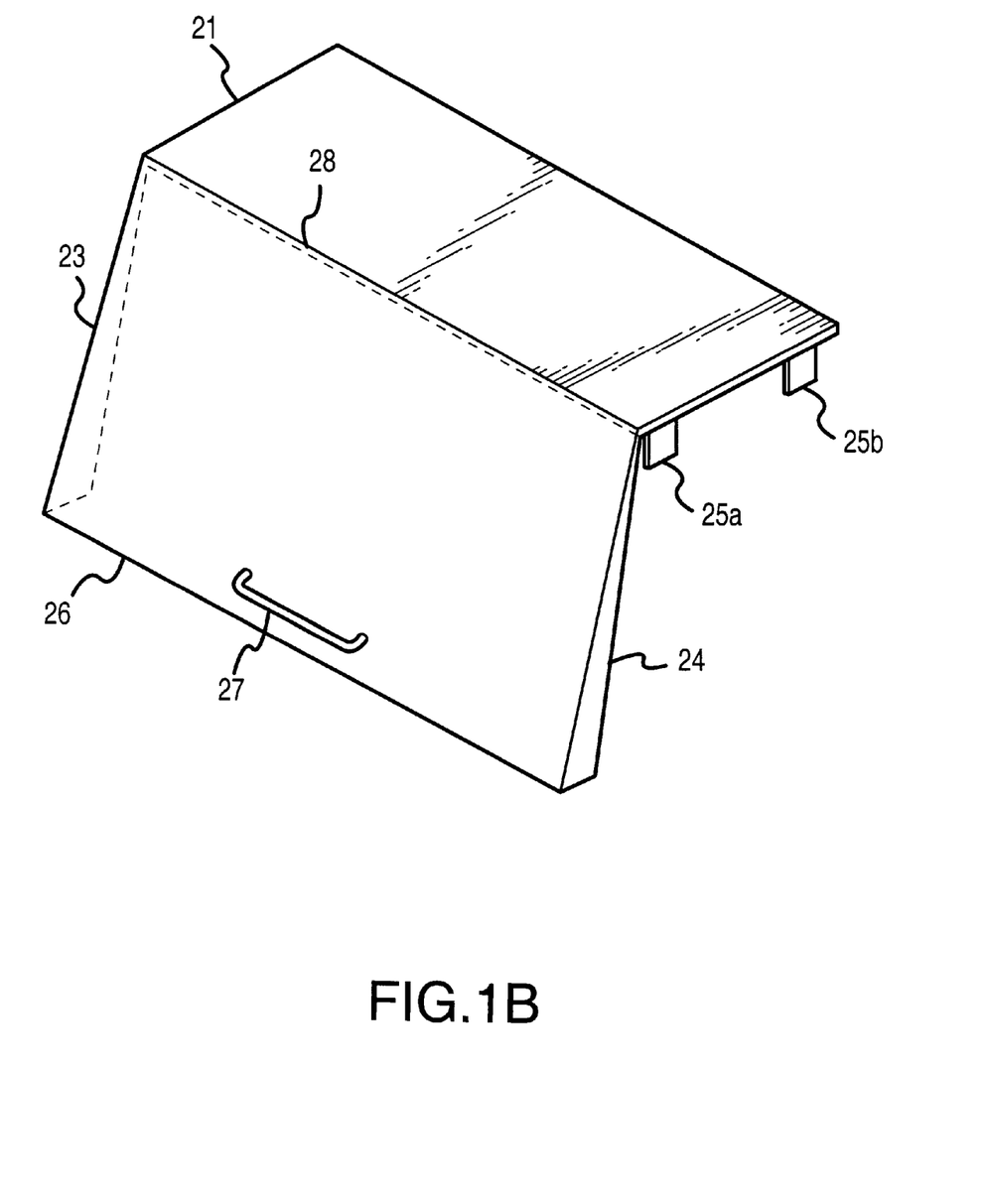
FIG. 1B depicts an exemplary optional hinged cover for converting the vertical hearth barbecue grill to an oven.

An optional cover, preferably made of metal, is shown in FIG. 1B. When used with the vertical barbecue grill of FIG. 1A, it establishes an oven-like enclosure in and about the cooking area of the grids, which helps with smoke-induced flavoring using an amount of wood chips in the firebox. The cover converts the vertical barbecue grill to a portable oven, which is particularly useful for baking or roasting, and comprises a top portion 21 that is preferably hinged to a frontal portion 26 at junction 28. A piano hinge, as well, may be used here. Top portion 21 may be supported by a top cooking grid while it rests on flanges 18a and 18b of respective hat channels attached to the sidewalls, or the cover may itself have a rigid construction. The top portion of the cover extends backward to but does not extend over the firebox. Tabs 25a and 25b shown on the right side of the top portion, and corresponding tabs on the left side of the cover, protrude into a space between respective left and right hat channels and sidewalls when the cover engages the respective sidewalls. Triangular baffles 23 and 24 on the front portion of the cover provide increased volume of a baking or broiling chamber within the enclosure formed by the cover when placed over the sidewalls. Stiffening ribs may be stamped into surfaces of the cover to improve rigidity and/or resist warping. Top portion 21 may also serve as a warming/cooking surface. A handle 27 provides convenient opening and closing of the chamber during cooking without substantial loss of trapped heat.

A set of front legs 30a and 30b, and rear legs 30c and 30d, elevates the barbecue grill to a convenient cooking height, typically thirty to thirty-four inches. The leg pairs swing outwardly front to back, rather than from side to side, in order to improve stability. A tabletop model need not include legs at all but may instead have insulating spacers. A low-profile unit may have shorter legs, e.g., four to ten inches. A non-portable backyard version of barbecue grill 10 need not have folding legs. Fixed legs, instead, may be provided. Further, the legs may be constructed from a variety of materials including tubular steel, aluminum, wood, etc.

Front leg pair 30a and 30b includes extension members 36a and 36b, if necessary, to obtain sufficient height. The leg extensions may be extendable and retractable within the leg housings and held in place at discretely extended or retracted points using conventional clamps, leg-locks, spring-loaded button-hole mechanisms, or the like. A cross member 31a, preferably comprising a flat metal slat, interconnects leg pair 30a and 30b to provide stability. Although illustrated on the inward side of the legs, slat 31a preferably attaches to the outward side of leg pair 31a and 31b so as to provide unobstructed folding over a retracted rear leg pair 30c and 30d. Rear leg pair 30c and 30d also includes extension members 36c and 36d as well as a cross member support 31b. Similarly, slat 31b preferably attaches to the outward side of leg pair 30c and 30d. One set of legs (either the front or the rear pair but preferably the rear) has a greater distance between them to permit retraction of both sets to the same plane whereby the cross member slats lie outwardly of the unit when the legs are folded to a retracted position. This arrangement provides a clearance underneath the slats for storing side shelves 82, 83 and/or an oven cover (FIG. 1B). A hinge cup 32 and axial pin 34, shown with respect to leg 30b, provide a pivot point and stop for the leg during extension and retraction. To provide stability against backward tipping of the vertical grill, rear leg pair 30c and 30d extend outside the rear plane of the base cavity. Instability or backward tipping tendencies may result from a rearward displacement of the barbecue grill's center of gravity upon loading the firebox.

In a portable model of the barbecue grill 10, the leg pairs are folding and extendable, as shown. Also, the height of the front and rear leg pairs (or insulating spacers if used instead) may differ in length (or height) to provide a forward incline of the base cavity in order to channel grease drippings towards the front of the unit. Inclination channels potentially flammable grease drippings away from the region of the firebox, thus reducing the chance of grease fires. Grease channeling may also be provided by forward inclination established by support members for a main cooking grid, subsequently described, which channels grease drippings to a grease box or grease trough preferably located in the inside front the base cavity 12. A non-portable model need not have folding legs but may include a base cavity construction that provides the same functionality.

Sidewall 16a pivotally connects to top lid 14 via hinges 20a and 20b, but may as well, be constructed so that it pivots from upper edges of the base cavity 12. Pivoting the sidewall from the top lid, though, advantageously permits a single locking clamp to rigidly fasten the sidewall to the base cavity when deployed and to fasten the top lid to the base cavity when collapsed, as subsequently shown and described. Similar hinging is provided for sidewalls 16b. Each sidewall includes cutouts 17a and 17b, shown in sidewall 16b, for providing air intake for a burning fuel of a firebox insertable in the barbecue grill housing 10. Further, the sidewalls include hat channels 19a and 19b (not shown) spot welded to the inside thereof. The hat channels 19 provide an internal air spacing that provide thermal insulation between the fuel chamber of the firebox and the exterior area of the barbecue grill 10. In addition, the hat channel includes a series of flanges 18a, 18b, and 18c for slideably supporting multiple cooking grids at various heights (and also at various temperatures) across the frontal face of the firebox when inserted into the barbecue grill housing. This arrangement is useful for interchangeably providing a method of subjecting foodstuffs to direct and indirect heating during cooking. Flange 18a also provides support for and engages a cover (FIG. 19), which encloses the area between to sidewalls to create an oven.

The basic structure of the barbecue grill including the sidewalls, base cavity and top lid provides a cooking area generally defined about the base cavity upwardly between the sidewalls. Advantageously, multilevel cooking grids positioned at levels defined by flanges 18a, 18b and 18c provide a variety of different cooking temperatures for various types of foods.

Figure 2:
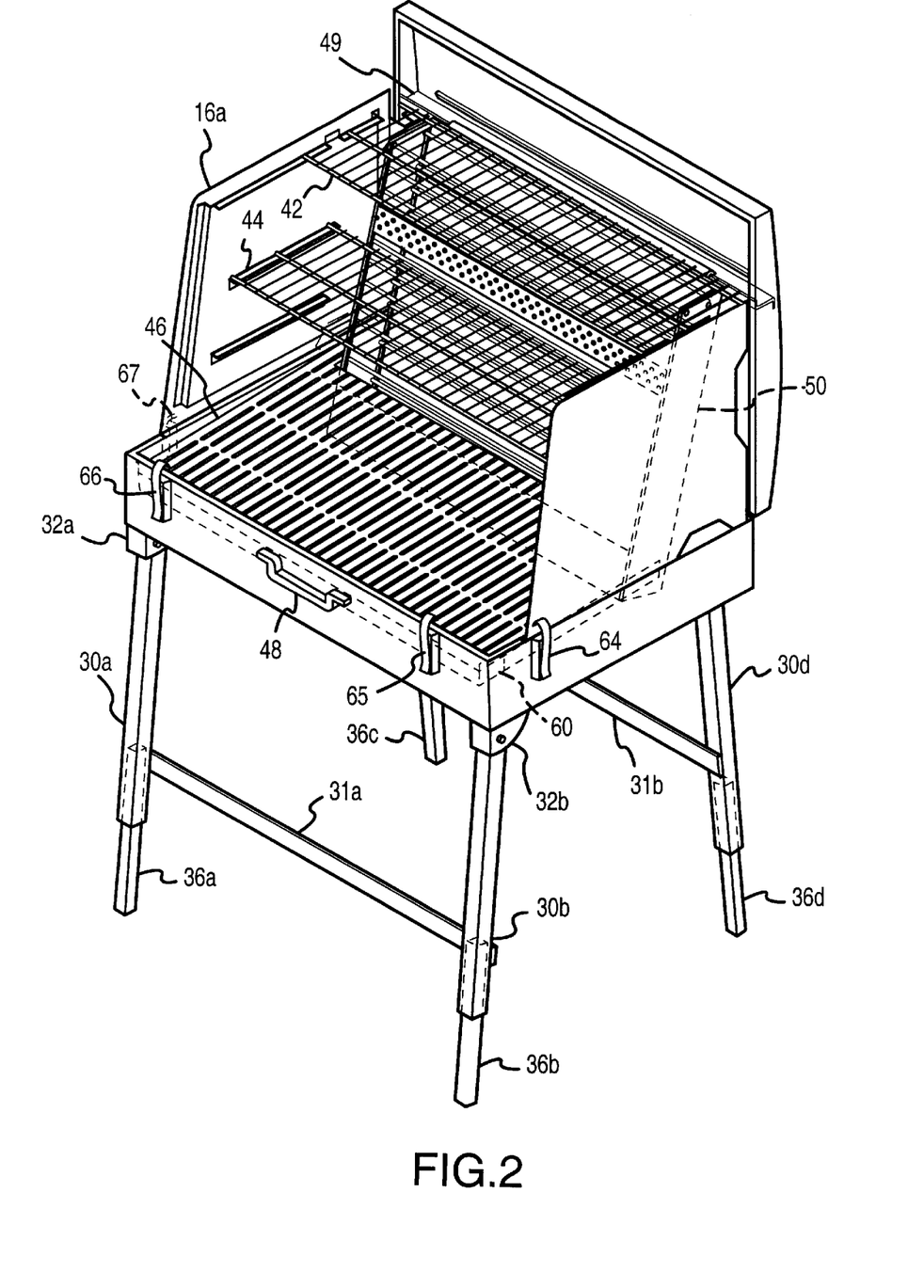
FIG. 2 depicts an embodiment of the barbecue grill of FIG. 1 including an inclined vertical firebox positioned in a base cavity and having multiple cooking grids horizontally positioned as various vertical levels across the face and/or top of the firebox.

FIG. 2 depicts the barbecue grill of FIG. 1 including a firebox 50 resting at an inclined positioned, a top grid 42 supported by a pair of top flanges including flange 18a, a mid-level grid 44 supported by a pair of mid-level flanges including a flange 18b or 18c, and a main grid 46 supported by a pair of flanges attached or spot welded inside the base cavity 12. Also shown in FIG. 2 is a handle 48 to provide convenient carrying the unit when collapsed and folded, as well as a set of cam locks 64, 65, 66 and 67 that fastened the top lid to the base cavity when collapsed. Handles may also be provided on the sides of the barbecue grill to facilitate movement when deployed.

Cam locks 64 and 67 also rigidly fasten sidewalls 16a and 16b to respective top edges of the base cavity 12. Top grid 42 and mid-level grid 44 are substantially horizontal. Cam locks 64 and 67, among other things, restrict lateral displacement of deployed sidewalls 19. Cooking grids 42 and 44 slideably engage sidewall guides formed by hat channel cut-outs, and may be displaced some distance from the firebox hearth so that indirect heating only is applied to foodstuffs. This is useful for broiling, roasting, or baking. In close proximity to the firebox hearth, the grids 42 and 44 permit direct heat to be applied to foodstuffs. In fact, grid 42 advantageously permits searing since it may be slideably position directly over the firebox hearth. In addition, pots or kettles may be placed on grid 42 or the face of the firebox for frying or boiling various foods. In fact, a complementary shaped pot or skillet (e.g., having a trapezoidal or triangular cross-sectional shape from a side view) may lie in facing contact with the front of the firebox to facilitate heating or frying of cooking oils or boiling water. Further, an elongated shallower pot or skillet may be constructed to lie directly over the firebox to span its length.

A lower main cooking grid 46, however, is preferably but need not be inclined forwardly to channel grease drippings to a grease box 60, which is located near the front of the base cavity 12. Instead of providing a grease box, a trough or channel may be provided against the front inside wall of the base cavity, which trough or channel, in turn, routes grease drippings to a grease container or box. The grease container may, as well, be located externally of the base cavity 12 by using, for example, tube extending about or through the base cavity. Importantly, channeling grease drippings away from the rear firebox region reduces grease fire hazards. Furthermore, providing a main grid construction of reduced transparency, i.e., plural elongated closely-spaced channels (FIG. 10) rather than using spaced wires, helps extinguishes any fire that may start in the lower base cavity.

Figure 3:
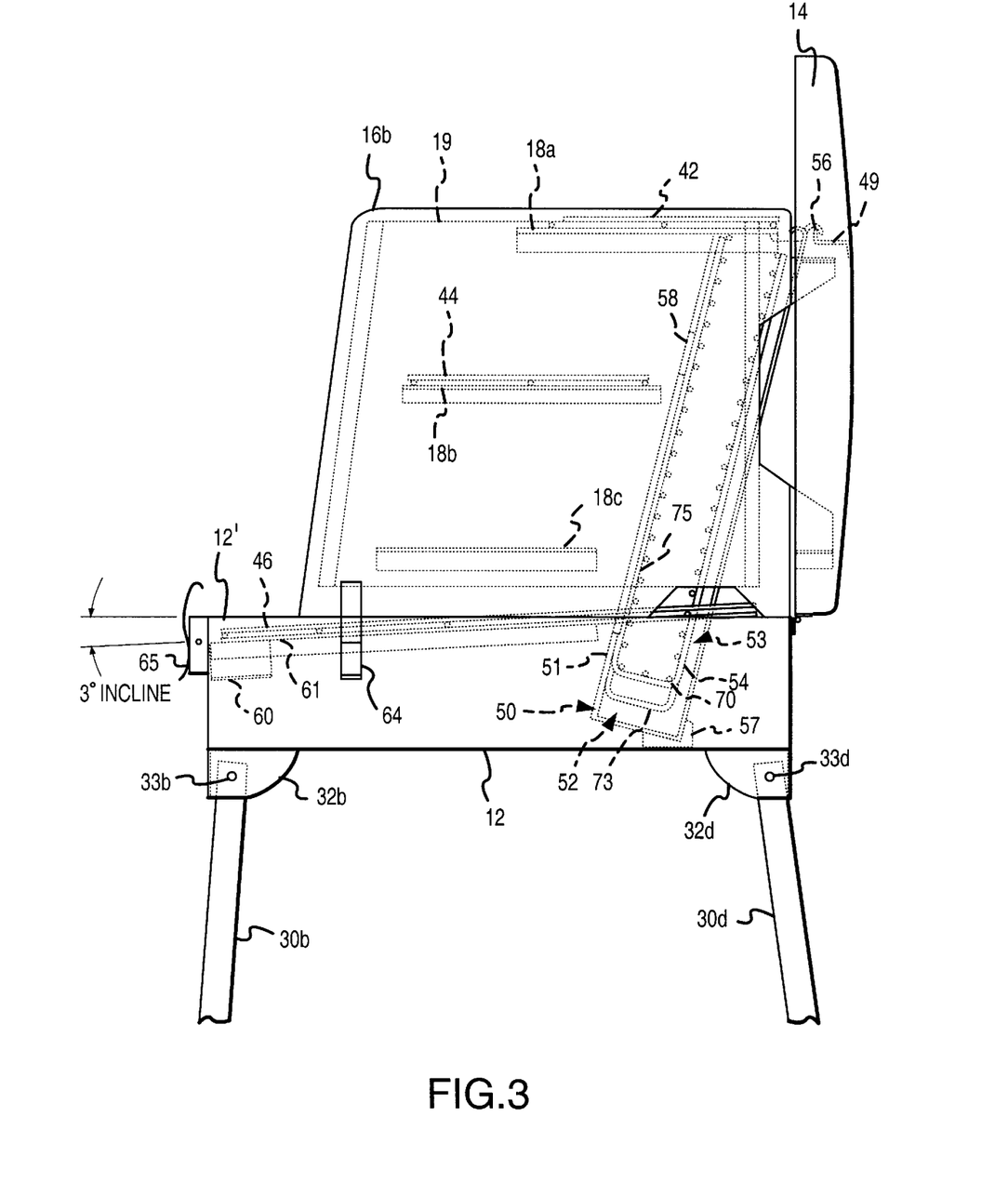
FIG. 3 is a side view of the barbecue grill of FIG. 2 illustrating yet other features including a grease box or trap, a downwardly sloping main cooking grid, an inclined firebox, an exemplary firebox receptacle or support structure, and an ash reservoir in the firebox.

FIG. 3 is a side view showing further details of the preferred structure of FIGS. 1 and 2. As shown, top lid 14 includes an inner shelf 49 that is spot-welded internally thereof and which provides a flange 49' (see FIG. 15) for supporting the upper portion of the firebox 50 via lip 56 located on the firebox housing. A flange or bracket 57 supports the firebox at a lower ended thereof. It should be noted that inclination of the firebox may be provided by a variety of structures, including support by other structures in the base cavity 12, or alternatively, by a supporting structure of the sidewalls. Rather than a pair of brackets 57, a cradle or receptacle that mates or interlocks with the firebox may be provided to support the firebox in an inclined position to achieve the advantages of simultaneously direct and indirect heating.

Firebox 50 preferably comprises a sheet metal housing which includes an ash reservoir or chamber 52 at the bottom thereof. This reservoir advantageously catches ashes in briquette-burning vertical grills, or provides a burner chamber for a gas-fired version (natural gas or propane). Since few, if any, ashes falls into the base cavity, the unit may be conveniently cleaned simply by removing, extinguishing burning charcoal, and/or dumping the ashes from the firebox. A firebox cover designed to close off air supply to burning charcoal may slideably attach (or attach by mating edges) to the firebox housing to extinguish oxidation. As known in the art, clean-up requirements have been a major obstacle to acceptance by many of charcoal-burning grills. Importantly, expended ashes that fall into the reservoir also assist in augmenting thermal insulation between oxidizing briquettes and the firebox housing. Chamber 52 may extend throughout a spacing 53 provided at the rear of the firebox housing.

Figure 6:
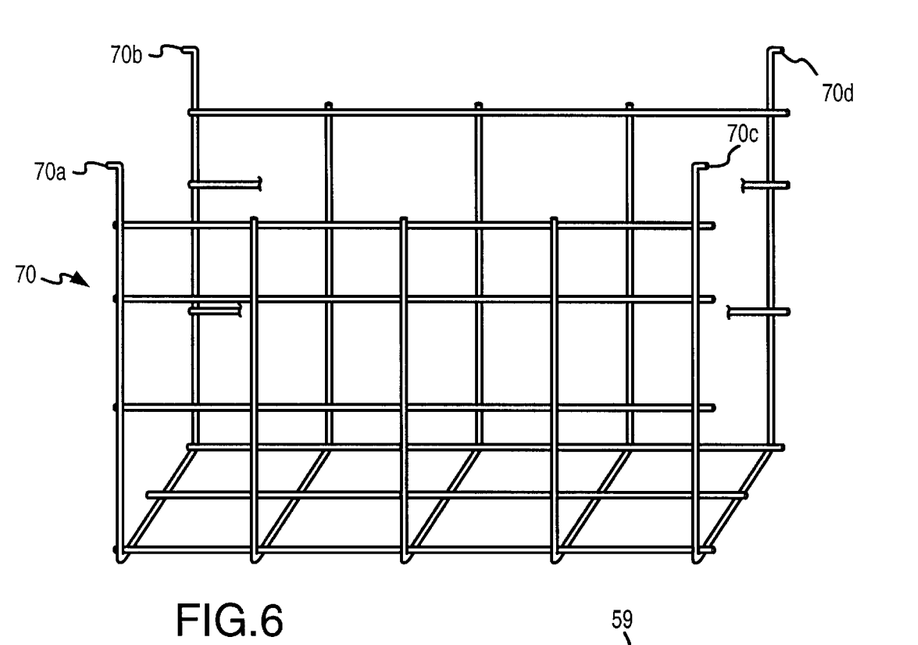
FIG. 6 is a perspective view of an exemplary structure for confining briquettes or gas-heated rocks within the firebox housing of FIG. 5, comprising a briquette basket, made of heat-resistant steel wire that holds a vertical wall of high-temperature coals or rocks in spaced thermal relation from the firebox housing.

Preferably, the firebox comprises a wire mesh basket 70 for retaining charcoal briquettes, wood chips (for smoked flavor), or other fuel. In the case of a gas-fire grill, the chamber 52 may house a gas burner for heating stones, rocks or heat retaining briquettes. The burner, though, need not be inside the firebox but may instead be located externally of the firebox. Further, multiple propane or natural gas burners may be incorporated internally or externally of the firebox. To attain high BTU output and more even heating between upper and lower regions of a gas-fired firebox, burners may be staggered at multiple levels about heat retention briquettes (not shown) either inside (i.e., embedded burners) or outside of the inclined firebox. Also, in one preferred embodiment, basket 70 extends further downwardly into the chamber 52 as shown at 73, and a facing portion 51 of the firebox is reduced in height to provide a greater area of direct exposure of coal grate 70 underneath the main cooking grid 46 so that direct heat may convect and radiate underneath main cooking grid 46. Also, instead of proving a "square" cross-sectional shape of the firebox bottom, as shown, the firebox bottom may be constructed to lie parallel with the bottom of the base cavity, e.g., having a cross-sectional shape similar to the top portion of the firebox.

Top grid 42 is preferably supported by flange 18a, or alternatively, may be pivotally supported by the top lid of the firebox or other structure of the barbecue grill 10. Flanges 18 are punched out of the sheet metal of hat channels 19. Flanges 18b and 18c of hat channel 19a are also sheet metal punchouts and horizontally support a mid-level grill 44 at respective vertical levels. Base cavity 12 includes a flange 61 spot welded to each side thereof for supporting the main cooking grid 46 to provide approximately three degrees (more or less) of forward incline from the rear to the front of the base cavity. The range of inclination of the main cooking grid, i.e. support flange 61, may range between approximately one or two degrees to perhaps as much as five to ten degrees. Higher or lower ranges may be used so as to channel grease dripping away from the firebox and/or towards a grease trap.

From the side view of FIG. 3, cam lock 64 is shown to rigidly fastened sidewalls 16b to the top edge of the base cavity 12. Cam lock 64 also fastens the top lid 14 to the base cavity 12 in tight, rigid mating relation when the barbecue grill is folded down and collapsed. Thus a lock engaging member 64' (FIG. 18) in the top lid 14 is positioned to engage cam lock 64 when the unit is folded down. A similar locking mechanism for the other side of lid 14 is provided for the opposed sidewall. When fastened in deployed mode, a rigid structure is provided which eliminates "flapping" members when the deployed unit is lifted, moved, or shaken. In essence the cam locks help establish a unitary rigid structure after deployment of the barbecue grill for convenient handling. Cam lock 65 engages a member 65' (FIG. 18) in order to help tighten the seal of top lid 14 against the base cavity 12.

Figure 4:
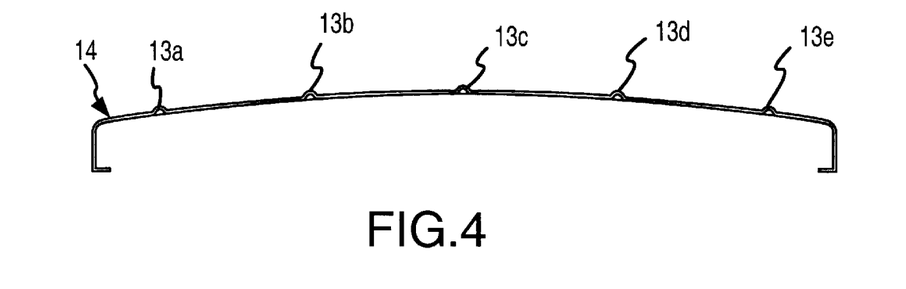
FIG. 4 is a side view of the top lid of the barbecue grill of FIG. 1 depicting plural stiffening ribs in the surface thereof.

Because the top lid 14 is exposed to extreme heat of the firebox, there is a tendency towards warping of portions of the metal as it expands unevenly. To resist warping, stiffening ribs 13a through 13e, as depicted in FIG. 4, are stamped into the sheet metal surface thereof. Further, insulating features of the firebox reduce heat exposure to the top lid, which further helps to minimize warping tendencies. The top lid may also include air passages, but preferably, such passages are provided in the sidewalls to avoid any openings in the barbecue grill housing when stowed and/or transported. Rigid fastening of the sidewalls to the base cavity further reduces warping tendencies.

Figure 5:
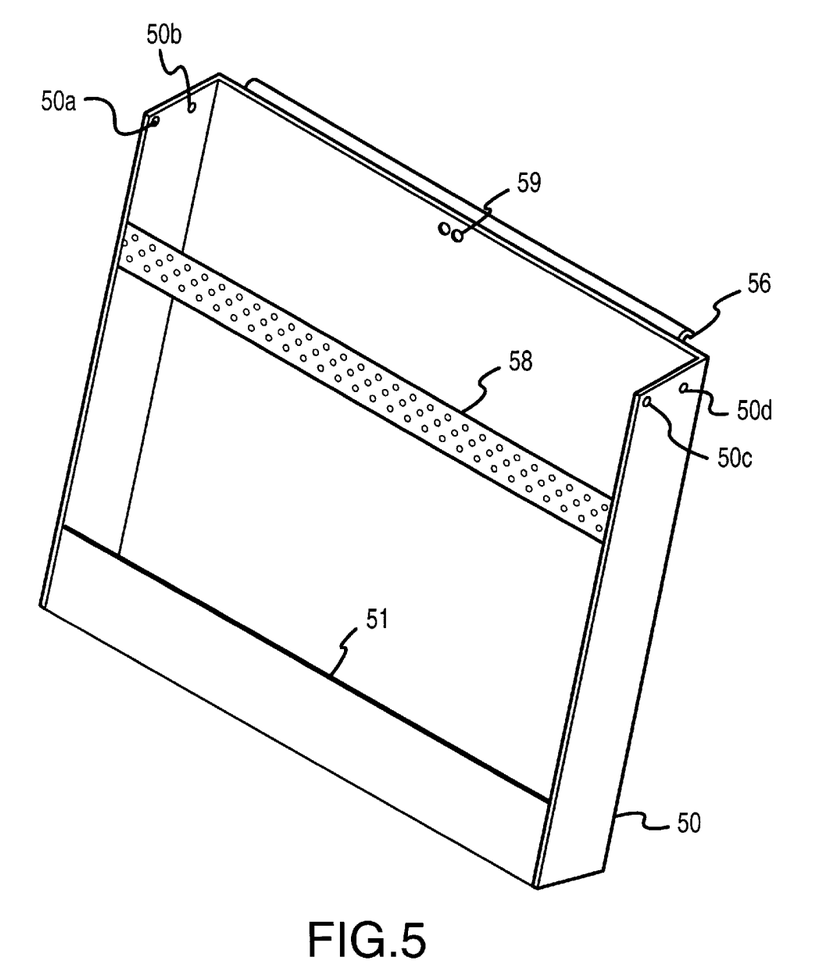
FIG. 5 is a partial perspective view showing rear and side sections of an embodiment of the firebox of FIGS. 2 and 3, absent a coal grate or briquette basket for confining briquettes or heat retention rocks.

FIG. 5 depicts further details of a preferred firebox construction. The firebox is preferably constructed of a heat resistant sheet metal having a low coefficient of expansion and includes a housing 50 having a crimped flange 56 that mates with a lip 49' (FIG. 15) of shelf lid 49, a lower facing portion 51 defining an ash reservoir (for charcoal) or burner chamber (for a gas burner) at the lower end of the firebox 50, and a heat barrier 58 that protects foodstuff from over cooking or burning at the mid-level cooking grid. Barrier 58 is preferably perforated, but may be a solid thermal blocking material, to laterally block at least a portion of thermal radiation from a mid-level cooking grid positioned thereabout. Instead of providing a thermal barrier on the firebox housing, any of the cooking grids themselves may include a barrier band attached to or integrated therewith, e.g., a spring-loaded band of metal attached to the edge closest to the firebox that springs up vertically perpendicular to the edge of the cooking grid when deployed.

FIG. 5 also depicts respective hole pairs 50a, 50b and 50c, 50d punched in sides of the firebox housing for supporting a wire basket 70 (FIG. 6) and receiving holes 59 for receiving a grasp handle for lifting a hot firebox from its cradle. Rod extensions 70a and 70b (FIG. 6) mate with hole pair 50a, 50b while rod extensions 70c and 70d (FIG. 6) mate with hole pair 50c, 50d (also shown in FIG. 7). About a one-half inch spacing (more or less) for an ash reservoir is provided in a rear cavity 53 (FIG. 3) and about two inches (more or less) is provided as an ash reservoir (or burner chamber) 53 (FIG. 3) in the bottom of the firebox. As earlier indicated, the cavities 52, 53 provide an ash trap and also provide thermal insulation. A gas-burning firebox may have less space in the chamber 53 since ashes are not encountered. In one embodiment, basket 70 of FIG. 6 holds four to ten pounds of charcoal briquettes in a two to three inch wide inclined vertical wall of briquettes. Basket 70 preferably comprises a high heat resistant material, such as a steel or iron alloy. Other materials that can withstand high temperatures, e.g., 1500 to 1800 degrees, and repeated thermal cycling will also suffice.

FIGS. 5 and 6 show an exemplary way to separate coals from the outer firebox housing although a variety of other schemes may be employed. For example, the sheet metal may include protruding ridges or serrated stampings to provide an air spacing to hold coals inward of the firebox. In one embodiment the firebox measures three inches from front to back and spans eighteen to twenty inches across the front of the barbecue grill. A height of the firebox may range from about fourteen to eighteen inches. These dimensions, of course, will vary according to the desired size of the cooking area to be provided by the barbecue grill. A typical firebox constructed according to the invention holding six to eight pounds of charcoal, during peak burning, will endure for about an hour outputting 48,000 to 64,000 BTUs per hour using conventional charcoal briquettes. This produces cooking temperatures within the space between the sidewalls of 500° F. or more. Larger or smaller briquette loads may be accommodated for higher or lower BTU outputs. Larger units are also useful for campside heating, as well as cooking. The BTU output of a propane or natural gas-fired version would obviously depend on the burner capacity. Propane-fired burners, for example, produce about 24,000 BTU per hour for each liter consumed. Thus, a propane-fired grill comparable to the above-mentioned typical charcoal-burning version would consume between 2.0 to 2.67 liters/hr to generate 48,000 to 64,000 BTUs per hour.

Figure 7:
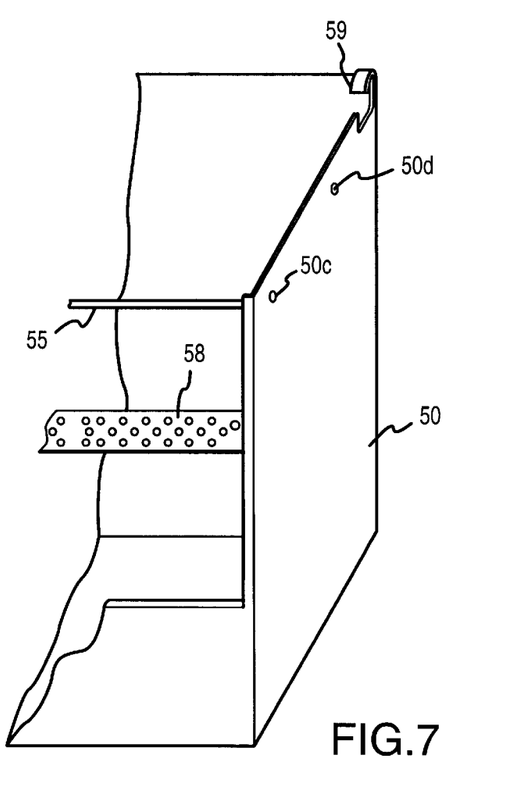
FIG. 7 is a partial cut-away perspective view of an exemplary firebox housing adapted for receiving the briquette basket of FIG. 6.

FIG. 7 depicts an alternative structure for supporting a top grid on the top surface of the firebox, e.g., a hook flange 59 which encircles a rear rod of a top grid 42, as indicated by ghost image of the grid 42 in FIG. 3. A structural rod 55 adds rigidity to the firebox construction.

Figures 8A, 8B, 8C:
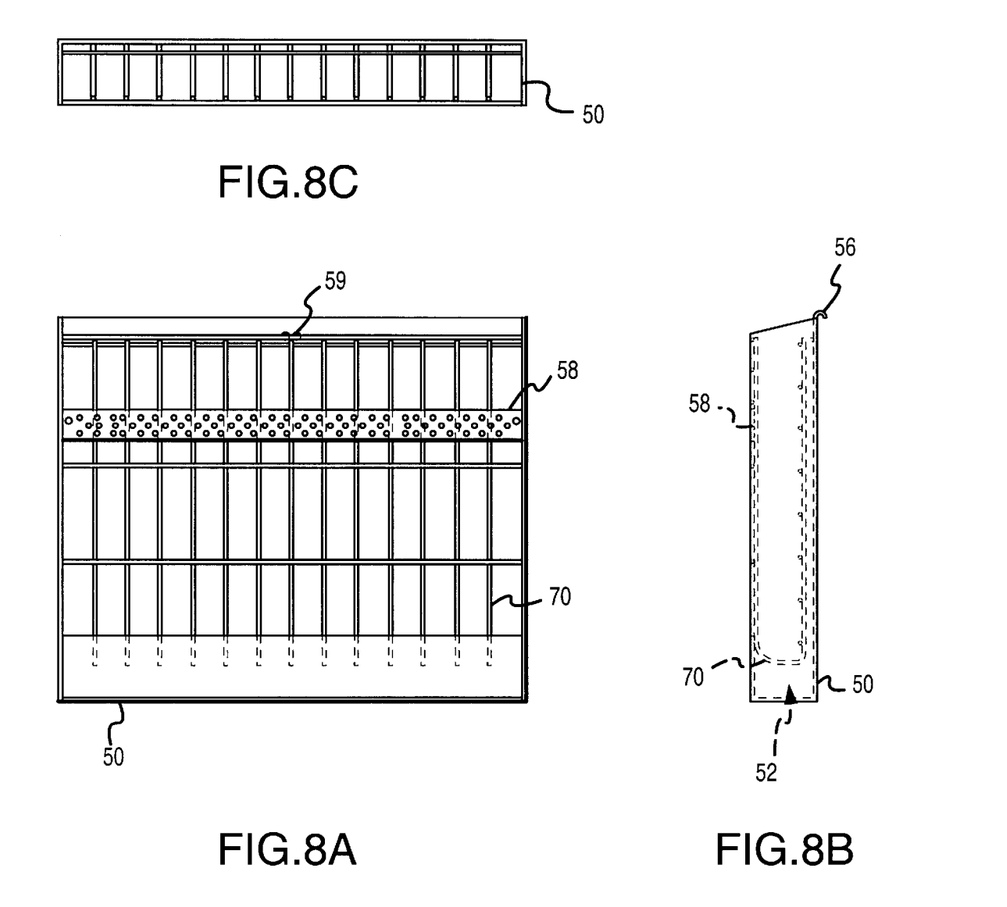
FIG. 8A is a front elevational view of an exemplary firebox for use with the barbecue grill of FIG. 1.
FIG. 8B is a side elevational view of the firebox of FIG. 8A.
FIG. 8C is a top elevational view of the firebox of FIG. 8A.

FIG. 8A, 8B, and 8C shows front, side and top views of a firebox constructed in accordance with an aspect of the invention wherein like numerals represent like elements.

Figure 9:
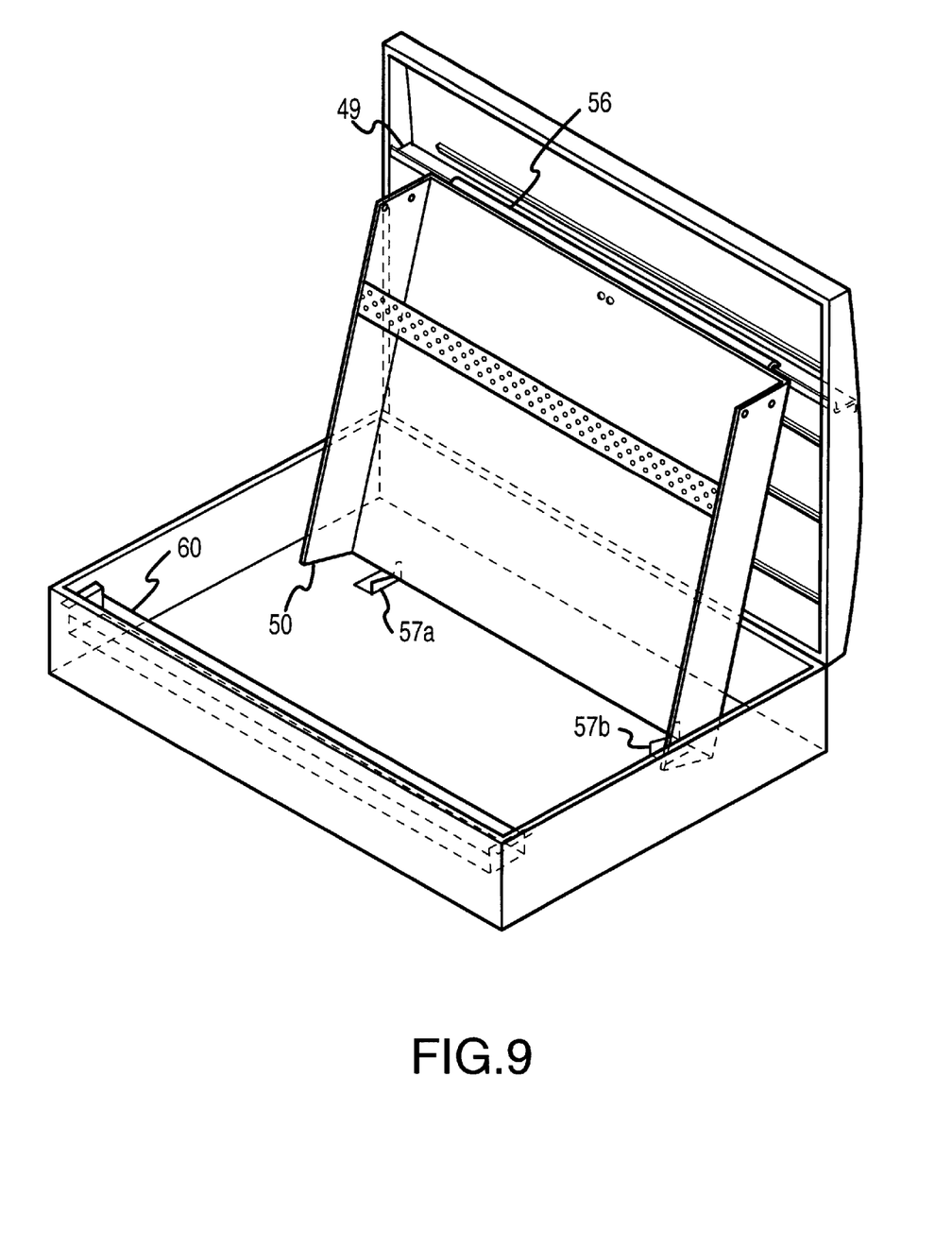
FIG. 9 illustrates the relationship of certain components of the exemplary barbecue grill of FIG. 1 depicting positioning and supporting of the firebox box housing within base cavity and top lid of the barbecue grill.

For the sake of illustrating inclined support for the firebox, FIG. 9 shows the housing portion of the firebox 50 resting in a receptacle formed by brackets 57a and 57b, which support the firebox at a lower portion thereof, and a flange 56 near the top of the firebox engaging a lip 49' of shelf 49. FIG. 9 also illustrates a grease box 60 located in the front of the base cavity of the grill.

While I describe my invention with reference to the above illustrative embodiments, the scope should not be limited. Many variations and modifications known to those ordinarily skilled in the art may be made without departing from the spirit of the invention, which is defined by the appended claims rather than by the exemplary embodiments described in the foregoing specification and drawings.

Accordingly, I claim:

1. A multi-level barbecue grill comprising:
a base cavity,
a top lid positionable upwardly near a rear of said base cavity,
a pair of sidewalls extending substantially vertically from respective sides of the base cavity in front of said top lid to define a cooking area between said sidewalls above said base cavity, said sidewalls being hinged on at least one of said top lid and said base cavity, each of said sidewalls comprising spaced apart inner and outer panels and including supports for supporting cooking grids,
a firebox positionable generally upward near a rear portion of said base cavity,
a main cooking grid positionable horizontally across a frontal face but above a lower portion of said firebox, and
at least one supplemental grid that is supported horizontally across said firebox above said main cooking grid.

2. The multi-level barbecue grill as recited in claim 1 wherein one of said supplemental cooking grids is positionable directly over said firebox to provide a region subjected to direct heating.

3. The multi-level barbecue grill as recited in claim 2, wherein said base cavity is arranged to provide a forward incline to effect the flow of cooking grease away from said firebox.

4. The multi-level barbecue grill as recited in claim 1, wherein said top lid includes an inner shelf that supports said firebox and that prevents substances from falling behind said firebox.

5. The multi-level barbecue grill as recited in claim 1, wherein said base cavity and top lid include mating lip that are inwardly beveled to provide spring-loaded sealing when the top lid is closed upon the base cavity.

6. The multi-level barbecue grill as recited in claim 1, including a cover that mates with top and front peripheral edges of said sidewalls thereby to form an oven-like enclosure about said main cooking grid.

7. The multi-level barbecue grill as recited in claim 6 wherein said firebox is inclined between three and twenty degrees from vertical whereby to provide heating from lateral and underside directions.

8. A multi-level barbecue grill comprising:
a base cavity,
a top lid positionable upwardly about a rear of said base cavity,
a pair of sidewalls extending generally upward from respective sides of said base cavity to define a cooking region in front of said top lid,
a firebox positionable generally upward form a rear portion of said base cavity,
a main cooking grid positionable horizontally across a lower portion of said firebox, and
a secondary cooking grid positionable above said main cooking grid,
wherein said top lid includes a shelf that prevents substances from falling behind said firebox.

9. A multi-level barbecue grill comprising:
a base cavity,
a top lid positionable upwardly at a rear of said base cavity,
a pair of sidewalls extending generally upward from respective sides of the base cavity to define a cooking region in front of said top lid,
a fire box positionable generally upwardly from a rear portion of said base cavity,
a main cooking grid positionable horizontally across a lower portion of said firebox,
a secondary cooking grid positionable above said main cooking grids and a cover positionable with said sidewalls to transform said barbecue grill to an oven for baking, roasting, broiling and/or grilling.

10. A multi-level barbecue grill comprising:
a base cavity,
a top lid positionable upwardly near a rear of said base cavity, a pair of sidewalls extending generally upward from respective sides of said base cavity to define a cooking region in front of said top lid, a firebox positionable generally upward from a rear portion of said base cavity, a main cooking grid positionable horizontally across a lower portion of said firebox, and a secondary cooking grid positionable above said main cooking grid, wherein said sidewalls include inner and outer panels which provide thermal insulation via spacing between said inner and outer panels.

11. The tabletop barbecue grill as recited in claim 10, further including supporting elements that hold said firebox so that a frontal face thereof is backwardly inclined relative to at least one of said cooking grid so as to provide heating from lateral and underside directions and to reduce the tendency of burning briquette ashes to fall onto said cooking grid.

12. A tabletop barbecue grill comprising:

a base cavity, a lid positionable upwardly near a rear of the base cavity, a pair of sidewalls extending generally upward from respective sides of the base cavity to define a cooking region in front of said lid, a firebox positionable generally upward near the rear of the base cavity, a main cooking grid positionable horizontally across a lower portion of the firebox, and a secondary cooking grid positionable above the main cooking grid, wherein the lid includes an inner shelf extending horizontally across the lid near an upper portion of the firebox thereby to prevent substances from falling behind the firebox.

13. A multi-level barbecue grill comprising:

a base cavity, a lid positionable upwardly near a rear of the base cavity, a pair of sidewalls extending generally upward from respective sides of the base cavity to define a cooking region in front of said lid, a firebox positionable generally upward near the rear of the base cavity, a main cooking grid positionable horizontally across a lower portion of the firebox, and at least one secondary cooking grid positionable above the main cooking grid, wherein the sidewalls are spaced from respective sides of the firebox thereby providing thermal insulation between the firebox and the sidewalls, and further, the sidewalls include insulating panels attached thereto which provide an air insulating space between inner and outer panels of the respective sidewalls.

14. In combination with a firebox for use with a barbecue grill wherein the firebox is positionable generally upward and includes a back, respective sides, a bottom, and an open top that define a fuel chamber and wherein the barbecue grill includes at least one cooking grid positionable horizontally across a front of the firebox, the improvement comprising:

a firebox support including at least one of a flange, tab, metal stamping, rib, plate, cradle, receptacle, pin, stud, stop, hook, screw, and bolt to support the firebox generally upward in a rear portion of the barbecue grill, and an ash reservoir within the firebox defined by a grate inside the firebox that permits ashes to pass but restricts passage of briquettes, the firebox including air vents in at least one of the sides and the back of the firebox wherein said air vents comprise sheet metal cutouts having flanges over which ash residue falls during burning of fuel.

\* \* \* \* \*